United States Patent
Kurushima

(10) Patent No.: US 11,665,033 B2
(45) Date of Patent: May 30, 2023

(54) TRANSMISSION DEVICE

(71) Applicant: JVCKENWOOD Corporation, Yokohama (JP)

(72) Inventor: Nobuyoshi Kurushima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 22 days.

(21) Appl. No.: 17/353,860

(22) Filed: Jun. 22, 2021

(65) Prior Publication Data

US 2022/0006675 A1    Jan. 6, 2022

(30) Foreign Application Priority Data

Jul. 6, 2020   (JP) .............................. JP2020-116427

(51) Int. Cl.
*H04L 27/10* (2006.01)

(52) U.S. Cl.
CPC .................................. *H04L 27/10* (2013.01)

(58) Field of Classification Search
CPC ....................................................... H04L 27/10
USPC ...................... 375/270, 301; 455/47, 109, 91
See application file for complete search history.

(56) References Cited

U.S. PATENT DOCUMENTS

| | | | | |
|---|---|---|---|---|
| 2,793,349 A * | 5/1957 | Crosby | ..................... | H03C 1/60 332/171 |
| 3,003,036 A * | 10/1961 | Greefkes | ................... | H04B 1/68 455/104 |
| 3,148,342 A * | 9/1964 | Holt | ........................ | H04H 20/88 381/16 |
| 3,546,607 A * | 12/1970 | Dixon | ...................... | H03D 3/04 331/49 |
| 4,424,593 A * | 1/1984 | Kahn | ....................... | H03C 1/52 455/263 |
| 4,596,022 A * | 6/1986 | Stoner | ..................... | H04L 27/10 375/334 |

FOREIGN PATENT DOCUMENTS

JP       09-083583       3/1997

* cited by examiner

*Primary Examiner* — Don N Vo
(74) *Attorney, Agent, or Firm* — Amin, Turocy & Watson, LLP

(57) ABSTRACT

A transmission device includes a frequency detector configured to detect a frequency of an input signal to generate frequency information; a signal generator configured to generate a modulation wave signal with a frequency equivalent to the frequency of the input signal based on the frequency information; and a single side band modulator configured to modulate a carrier wave by the modulation wave signal.

4 Claims, 8 Drawing Sheets

TRANSMISSION DEVICE

CROSS-REFERENCE TO RELATED APPLICATION

This application claims priority from Japanese Application No. 2020-116427, filed on Jul. 6, 2020, the contents of which are incorporated by reference herein in its entirety.

FIELD

The present application relates to a transmission device.

BACKGROUND

In digital wireless communication, a frequency shift keying (FSK) type transmission device is known. For example, JP H9-83583 A describes a frequency modulation (FM) type FSK transmission device.

Since the FSK transmission device described in JP H9-83583 A is an FM modulation type, the frequency shift error depends on the FM modulation characteristics. In JP H9-83583 A, the FSK signal after modulation is demodulated, and based on a result thereof, a frequency shift is adjusted to be appropriate.

By the way, an audio frequency shift keying (AFSK) transmission device of a single side band (SSB) modulation type can manage the frequency shift with an oscillation frequency of an extremely stable and highly accurate low frequency transmitter, and therefore it is possible to create an FSK signal with few errors for the frequency shift. However, in a case of the AFSK transmission device of the SSB modulation type, if a harmonic distortion component is present in the AFSK signal, a distortion component may be modulated to be output as an FSK signal.

SUMMARY

A transmission device is disclosed.

According to one aspect, there is provided a transmission device comprising: a frequency detector configured to detect a frequency of an input signal to generate frequency information; a signal generator configured to generate a modulation wave signal with a frequency equivalent to the frequency of the input signal based on the frequency information; and a single side band modulator configured to modulate a carrier wave by the modulation wave signal.

According to one aspect, there is provided a transmission device comprising: a frequency detector configured to detect a frequency of an input signal to generate frequency information; an addition circuit configured to add frequency information of a carrier wave to the frequency information to generate modulated wave frequency information; and a signal generator configured to generate a modulated wave signal based on the modulated wave frequency information.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Figure 1:
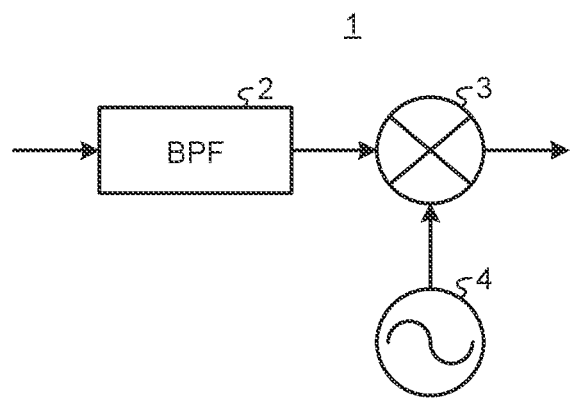
FIG. 1 is a diagram illustrating a configuration example of a transmission device according to a comparative example.

Embodiments according to the present application will be described below in detail with reference to accompanying drawings. Note that the present application is not limited by the embodiments, and when there is a plurality of embodiments, the present application also includes a configuration of a combination of the embodiments. Further, in the following embodiments, the same parts are designated by the same reference numerals to omit duplicate description.

Comparative Example

A configuration of a transmission device according to a comparative example will be described with reference to FIG. 1. FIG. 1 is a diagram illustrating the configuration example of the transmission device according to the comparative example.

As illustrated in FIG. 1, a transmission device 1 includes a band pass filter (BPF) 2, an SSB modulator 3, and a local oscillator circuit 4. The transmission device 1 is an AFSK type FSK transmission device that SSB-modulates an AFSK signal to transmit an FSK signal.

The AFSK type is a communication method for transmitting information by switching signals of two different audible frequencies exclusively for "0" and "1 as AFSK signals. Further, the AFSK signals may be for not only binary, but also a multivalued communication method such as 4-value using four audible frequencies and 8-value using eight audible frequencies.

The BPF 2 receives the AFSK signals. The BPF 2 passes a signal in a predetermined frequency band among the AFSK signals and outputs the signal to the SSB modulator 3. The predetermined frequency band is, for example, 300 Hz to 3 kHz, which is a passband of a normal SSB signal.

The SSB modulator 3 SSB-modulates the AFSK signal output from the BPF 2. The SSB modulator 3 generates and outputs a desired FSK signal according to the frequency of the local oscillator circuit 4.

Figure 2:
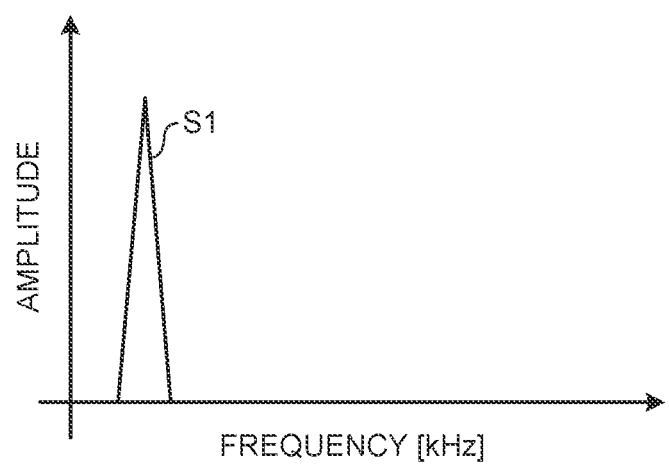
FIG. 2 is a spectral diagram for explaining an ideal AFSK signal.

FIG. 2 is a spectral diagram for explaining an ideal AFSK signal. FIG. 2 illustrates only one of multivalued signals. In FIG. 2, a horizontal axis indicates a frequency (kHz). A vertical axis indicates a magnitude of an amplitude. FIG. 2 illustrates a fundamental wave S1. The fundamental wave S1 is, for example, an AFSK signal with a frequency of 1 kHz. As illustrated in FIG. 2, the ideal AFSK signal output from the BPF 2 does not contain any components other than the fundamental wave S1.

Figure 3:
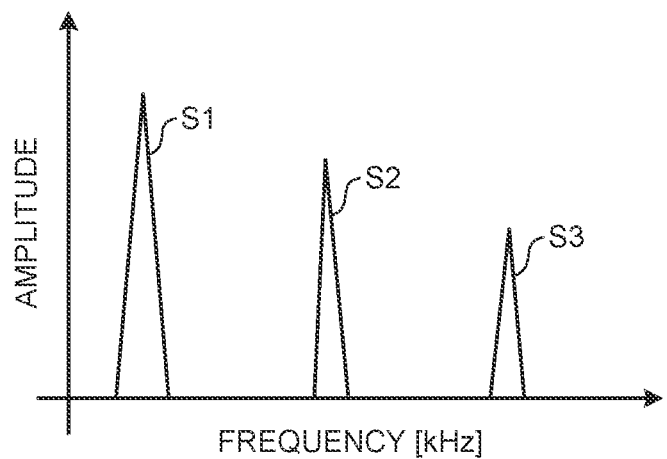
FIG. 3 is a spectral diagram for explaining harmonics of an AFSK signal.

FIG. 3 is a spectral diagram for explaining harmonics of an AFSK signal. In FIG. 3, a horizontal axis indicates a frequency (kHz). A vertical axis indicates an magnitude of an amplitude. As illustrated in FIG. 3, the AFSK signal output from the BPF 2 may include a second harmonic S2 and a third harmonic S3, and when the frequency of the fundamental wave S1 is 1 kHz, the frequency of the second harmonic S2 is 2 kHz and the frequency of the third harmonic S3 is 3 kHz.

Figure 4:
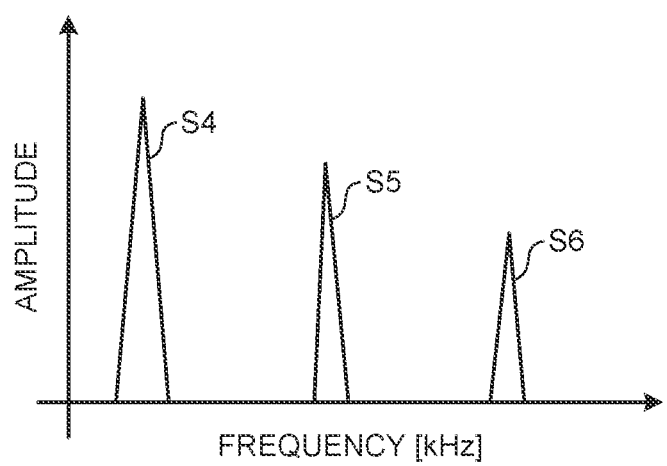
FIG. 4 is a spectral diagram for explaining an FSK signal.

FIG. 4 is a spectral diagram for explaining an FSK signal transmitted from the transmission device 1. In FIG. 4, a horizontal axis indicates a frequency (MHz). A vertical axis indicates a magnitude of an amplitude. A carrier wave S4 is a signal obtained by the SSB modulation of the fundamental wave S1. A spurious S5 is a signal obtained by the SSB modulation of the second harmonic S2. A spurious S6 is a signal obtained by the SSB modulation of the third harmonic S3. The frequency of the carrier wave S4 is, for example, 14.101 MHz. The frequency of the spurious S5 is, for example, 14.102 MHz. The frequency of the spurious S6 is, for example, 14.103 MHz.

In the transmission device 1 according to the comparative example, if a harmonic distortion component is present in the AFSK signal, the distortion component is SSB-modulated and output as an FSK signal. The harmonic FSK signal can be a spurious component of the fundamental wave FSK signal. Further, the AFSK signal itself may contain harmonic components, and if an input level of the AFSK signal is excessive, a distortion component may be generated in a low frequency region. Thus, the AFSK type FSK transmission device has a problem of generating spurious.

The present application provides a transmission device capable of removing spurious contained in an FSK signal by performing SSB modulation after reducing the distortion contained in an AFSK signal.

First Embodiment

Figure 5:
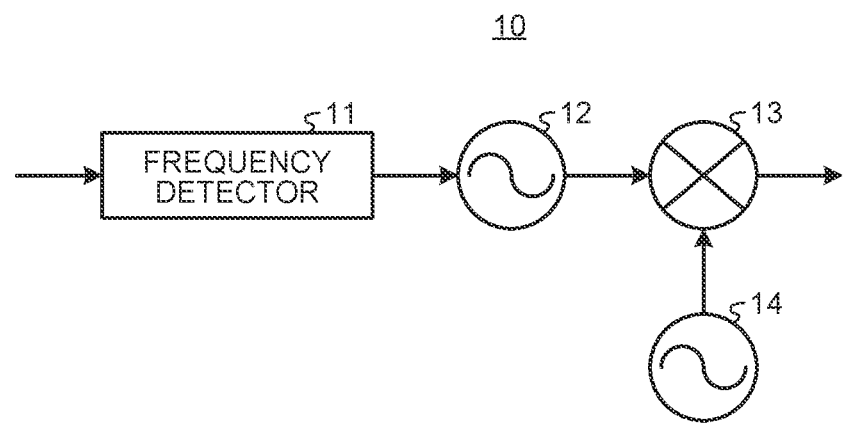
FIG. 5 is a diagram illustrating a configuration example of a transmission device according to a first embodiment.

A configuration of the transmission device according to a first embodiment will be described with reference to FIG. 5. FIG. 5 is a diagram illustrating a configuration example of the transmission device according to the first embodiment.

As illustrated in FIG. 5, a transmission device 10 includes a frequency detector 11, a signal generator 12, an SSB modulator 13, and a local oscillator circuit 14.

The frequency detector 11 detects the AFSK signal input to the transmission device 10. The frequency detector 11 FM-detects the input AFSK signal by an arctangent detection. The frequency detector 11 detects the frequency of the AFSK signal by the FM detection and generates frequency information. The frequency detector 11 includes, for example, an FM detector. The AFSK signal input to the frequency detector 11 is also called an input signal. Note that the frequency of the AFSK signal input to the transmission device 10 is arbitrary within a voice frequency band such as 300 Hz to 3000 Hz. The frequency of the AFSK signal input to the transmission device 10 may change depending on the configuration of the transmission device 10, the communication status, and the like.

Figure 6:
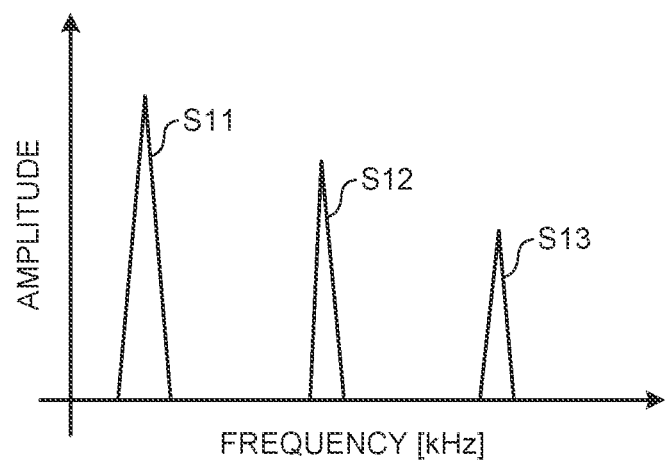
FIG. 6 is a diagram for explaining the AFSK signal detected by a frequency detector.

FIG. 6 is a diagram for explaining the AFSK signal detected by the frequency detector 11. In FIG. 6, a horizontal axis indicates a frequency (kHz). A vertical axis indicates a magnitude of an amplitude. As illustrated in FIG. 6, it is assumed that the AFSK signal input to the frequency detector 11 includes a fundamental wave S11, a second harmonic S12, and a third harmonic S13. The frequency detector 11 detects the frequencies of the fundamental wave S11, the second harmonic S12, and the third harmonic S13 by the FM detection. In the example illustrated in FIG. 6, the frequency detector 11 detects that the frequency of the fundamental wave S11 is 1 kHz, the frequency of the second harmonic S12 is 2 kHz, and the frequency of the third harmonic S13 is 3 kHz. In this case, the frequency detector 11 generates frequency information indicating that the fundamental wave S11 with a frequency of 1 kHz, the second harmonic S12 with a frequency of 2 kHz, and the third harmonic S13 with a frequency of 3 kHz are included in the input AFSK signal. The frequency detector 11 outputs the generated frequency information to the signal generator 12.

Referring back to FIG. 5, the signal generator 12 generates a modulation wave signal. The signal generator 12 generates the modulation wave signal based on the frequency information input from the frequency detector 11. The signal generator 12 includes, for example, a numeric controlled oscillator (NCO).

Figure 7:
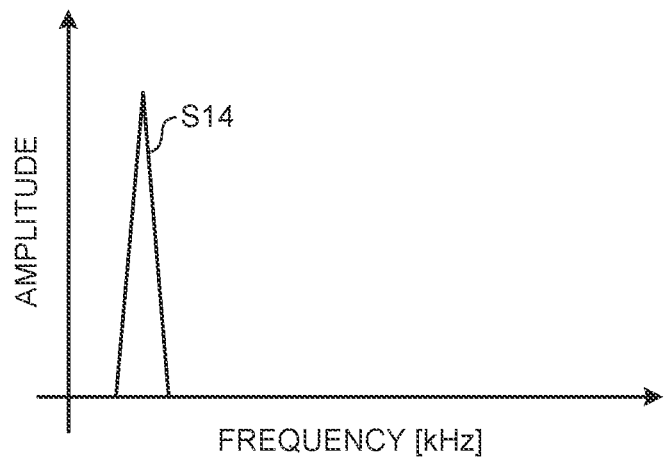
FIG. 7 is a diagram for explaining a modulation wave signal generated by a signal generator.

FIG. 7 is a diagram for explaining the modulation wave signal generated by the signal generator 12. In FIG. 7, a horizontal axis indicates a frequency (kHz). A vertical axis indicates a magnitude of an amplitude. As illustrated in FIG. 7, the signal generator 12 generates a modulation wave signal S14 based on the frequency information input from the frequency detector 11. The modulation wave signal S14 is a modulation wave signal corresponding to the fundamental wave S11 detected by the frequency detector 11. The signal generator 12 generates the modulation wave signal of only the fundamental wave included in the AFSK signal input to the frequency detector 11. In other words, the signal generator 12 generates the modulation wave signal so as to remove the harmonics included in the AFSK signal input to the frequency detector 11. The signal generator 12 outputs the generated modulation wave signal S14 to the SSB modulator 13.

Referring back to FIG. 5, the SSB modulator 13 performs SSB modulation on the carrier wave input from the local oscillator circuit 14 by the modulation wave signal S14 input from the signal generator 12. The SSB modulator 13 performs the SSB modulation by mixing the frequency of the modulation wave signal input from the signal generator 12 and the frequency of the carrier wave input from the local oscillator circuit 14, and generates an FSK signal of a desired frequency.

Figure 8:
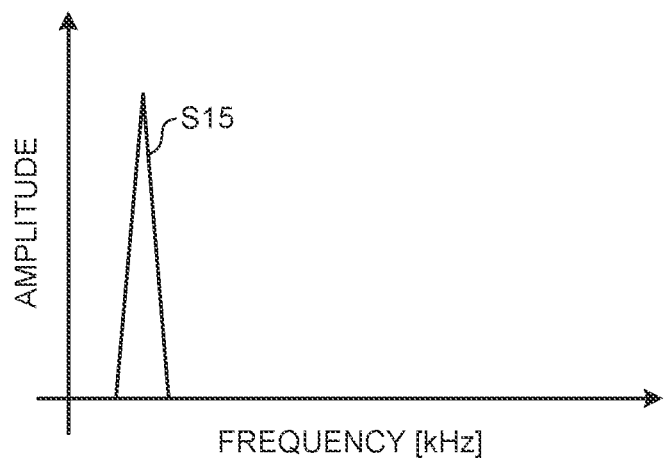
FIG. 8 is a diagram for explaining an FSK signal generated by an SSB modulator.

FIG. 8 is a diagram for explaining the FSK signal generated by the SSB modulator 13. In FIG. 8, a horizontal axis indicates an frequency (MHz). A vertical axis indicates a magnitude of an amplitude. As illustrated in FIG. 8, the SSB modulator 13 performs the SSB modulation by mixing the frequency of the modulation wave signal S14 input from the signal generator 12 and the frequency of the carrier wave input from the local oscillator circuit 14 to generate a carrier wave S15. The frequency of the modulation wave signal S14 is 1 kHz. The frequency of the signal input from the local oscillator circuit 14 is 14.100 MHz. Therefore, the frequency of the carrier wave S15 is from 14.1003 MHz to 14.1030 MHz. The SSB modulator 13 outputs the carrier wave S15. As a result, the transmission device 10 transmits the carrier wave S15 to a reception device or the like.

As described above, in the first embodiment, the signal generator 12 generates the modulation wave signal of only the fundamental wave based on the frequency information generated by the frequency detector 11. In the first embodiment, the SSB modulation is performed only on the modulation wave signal of the fundamental wave generated by the signal generator 12. Thus, in the first embodiment, the distortion component can be reduced and the spurious contained in the FSK signal can be removed.

Variation Example of the First Embodiment

In the first embodiment, the frequency of the fundamental wave of the AFSK signal has been described as 1 kHz, but the present application is not limited thereto. In practice, since the AFSK signal is modulated, the frequency thereof is not a single spectrum, but shifted to two or more values depending on the frequency shift. That is, the spectrum of the fundamental wave of the present application may be two or more.

Figure 9:
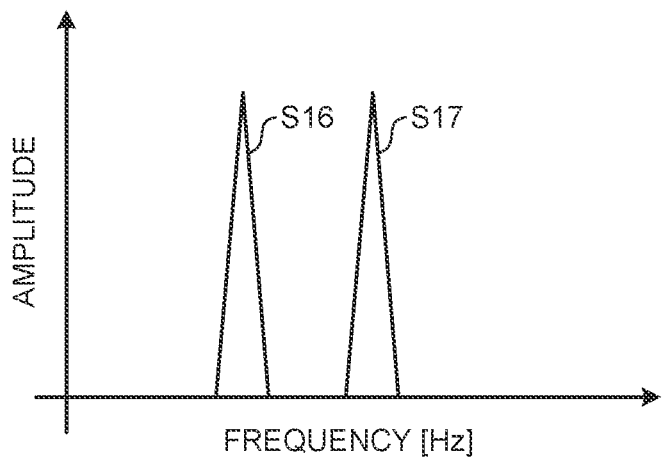
FIG. 9 is a signal for explaining an RTTY signal.

FIG. 9 is a signal for explaining a radio teletype (RTTY) signal. In FIG. 9, a horizontal axis indicates a frequency (Hz). A vertical axis indicates a magnitude of an amplitude. In FIG. 9, a mark signal S16 and a space signal S17 are illustrated. A frequency of the mark signal S16 is 1275 Hz. A frequency of the space signal S17 is 1445 Hz. In the example illustrated in FIG. 9, the SSB modulator 13 performs SSB modulation on each signal, that is, the mark signal S16 and the space signal S17.

Figure 10:
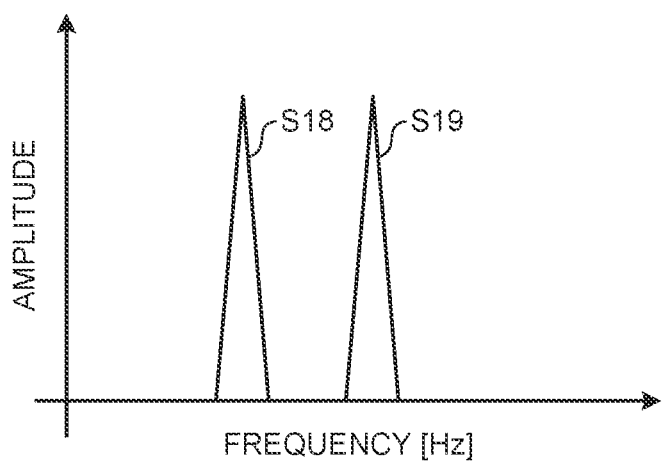
FIG. 10 is a diagram for explaining the FSK signal generated from the RTTY signal.

FIG. 10 is a diagram for explaining the FSK signal generated from the RTTY signal. In FIG. 10, a horizontal axis indicates a frequency (MHz). A vertical axis indicates a magnitude of an amplitude. In FIG. 10, a carrier wave S18 and a carrier wave S19 are illustrated. The carrier wave S18 is an FSK signal generated by performing the SSB modulation on the mark signal S16. The carrier wave S19 is an FSK signal generated by performing the SSB modulation on the space signal S17. A frequency of the carrier wave S18 is 14.101275 MHz. A frequency of the carrier wave S19 is 14.101445 MHz. As illustrated in FIG. 10, the FSK signals of the mark signal S16 and the space signal S17 are obtained.

Second Embodiment

Figure 11:
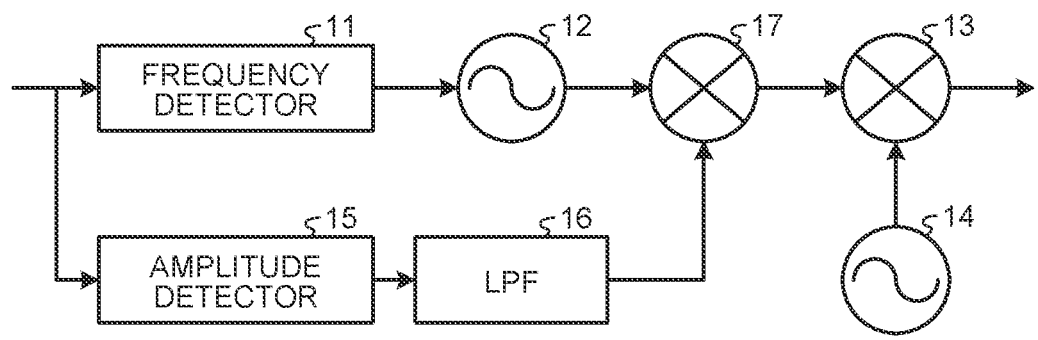
FIG. 11 is a diagram illustrating a configuration example of a transmission device according to a second embodiment.

A configuration of the transmission device according to the second embodiment will be described with reference to FIG. 11. FIG. 11 is a diagram illustrating a configuration example of the transmission device according to the second embodiment.

As illustrated in FIG. 11, a transmission device 10A includes the frequency detector 11, the signal generator 12, the SSB modulator 13, the local oscillator circuit 14, an amplitude detector 15, a low pass filter (LPF) 16, and a multiplication circuit 17. The transmission device 10A is a transmission device capable of outputting an FSK signal with amplitude information similar to the amplitude information input as a modulation wave signal like a normal SSB transmission device. In the second embodiment, the AFSK signal input to the transmission device 10A is input to the frequency detector 11 and the amplitude detector 15.

The frequency detector 11 detects the frequency of the AFSK signal input to the transmission device 10A, and outputs frequency information regarding the detected frequency to the signal generator 12. The signal generator 12 generates a modulation wave signal based on the frequency information input from the frequency detector 11 and outputs the generated modulation wave signal to the multiplication circuit 17.

The amplitude detector 15 detects an amplitude of the AFSK signal input to the transmission device 10A. The amplitude detector 15 generates amplitude information including the information of the detected amplitude.

Figure 12:
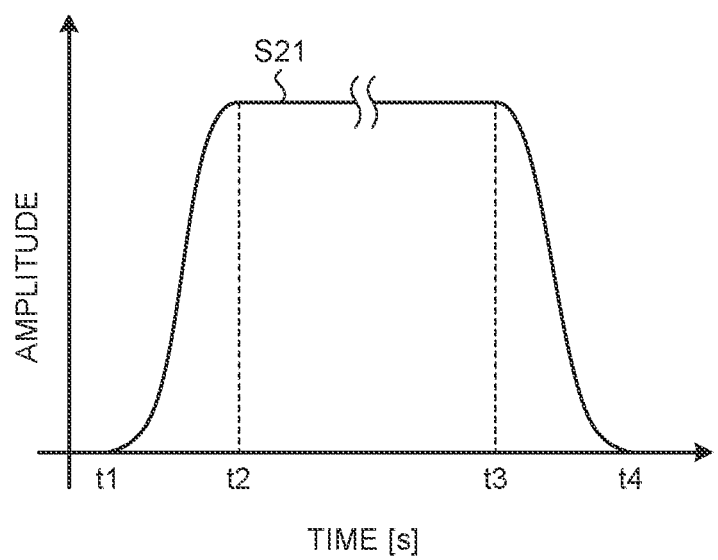
FIG. 12 is a diagram for explaining an amplitude of the AFSK signal detected by an amplitude detector.

FIG. 12 is a diagram for explaining the amplitude of an AFSK signal detected by the amplitude detector 15. As illustrated in FIG. 12, an AFSK signal S21 has a characteristic that the amplitude rises to a predetermined value from a time t1 to a time t2. The AFSK signal S21 also has a characteristic that the amplitude between the time t2 and a time t3 is constant. Furthermore, the AFSK signal S21 has a characteristic that the amplitude drops to zero from the time t3 to a time t4. In the example illustrated in FIG. 12, the amplitude detector 15 detects the amplitude of the AFSK signal S21 at each time. The amplitude detector 15 generates the amplitude information including information of the amplitude of the AFSK signal S21 at each time. The amplitude detector 15 outputs the generated amplitude information to the LPF 16.

Referring back to FIG. 11, the LPF 16 shapes the AFSK signal to generate a waveform shape signal. The LPF 16 is configured to be capable of transmitting changes in the amplitude of the AFSK signal input to the transmission device 10A and have the characteristic of removing unnecessary noise components. Specifically, the LPF 16 generates, for example, the waveform shape signal capable of generating the FSK signal corresponding to the amplitude of the AFSK signal input to the transmission device 10A. The LPF 16 outputs the generated waveform shape signal to the multiplication circuit 17.

The multiplication circuit 17 has one input terminal to which the modulation wave signal generated based on the frequency information is input from the signal generator 12. The multiplication circuit 17 has the other input terminal to which the waveform shape signal is input from the LPF 16. The multiplication circuit 17 multiplies the modulation wave signal by the waveform shape signal to generate a modulation wave signal corresponding to the amplitude of the AFSK signal input to the transmission device 10A. The multiplication circuit 17 outputs the generated modulation wave signal to the SSB modulator 13.

The SSB modulator 13 performs the SSB modulation by mixing the frequency of the modulation wave signal input from the multiplication circuit 17 and the frequency of the carrier wave input from the local oscillator circuit 14 to generate an FSK signal corresponding to a desired frequency and the amplitude of the AFSK signal input from the transmission device 10A. As a result, the transmission device 10A transmits the FSK signal corresponding to the desired frequency and the amplitude of the AFSK signal input to the transmission device 10A to the reception device or the like.

As described above, the second embodiment outputs the FSK signal corresponding to the amplitude of the AFSK signal input to the transmission device 10A. Thus, in the second embodiment, a user of the transmission device 10A can control the amplitude of the FSK signal to be output by arbitrarily controlling the amplitude of the AFSK signal input to the transmission device 10A.

Third Embodiment

Figure 13:
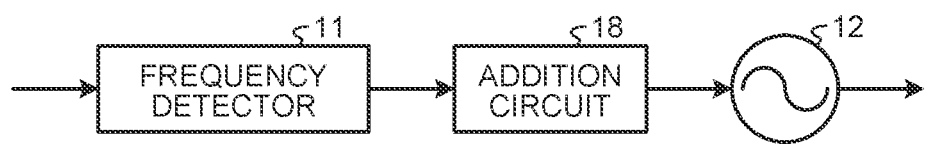
FIG. 13 is a diagram illustrating a configuration example of a transmission device according to a third embodiment.

A configuration of the transmission device according to the third embodiment will be described with reference to FIG. 13. FIG. 13 is a diagram illustrating a configuration example of the transmission device according to the third embodiment.

As illustrated in FIG. 13, a transmission device 10B includes the frequency detector 11, the signal generator 12, and an addition circuit 18. The transmission device 10B is a transmission device that directly generates an FSK signal of a desired frequency without performing the SSB modulation.

In the third embodiment, the frequency detector 11 detects the frequency of the AFSK signal input to the transmission device 10B to output frequency information regarding the detected frequency to the addition circuit 18.

The addition circuit 18 stores in advance information regarding a desired frequency of the FSK signal to be transmitted to a reception device or the like. The addition circuit 18 may have a function of acquiring the information regarding a desired frequency of the FSK signal from an external control device or the like, which is not illustrated.

The addition circuit 18 calculates a difference between the desired frequency of the FSK signal and the AFSK signal input to the transmission device 10B based on the frequency information input from the frequency detector 11 and the information regarding the desired frequency of the FSK signal. The addition circuit 18 updates the frequency information input from the frequency detector 11 by adding the calculated difference value to the frequency included in the frequency information input from the frequency detector 11 to generate modulated wave frequency information. Specifically, the addition circuit 18 updates the frequency information so that the frequency of the FSK signal output from the transmission device 10B falls within a range from 14.1003 MHz to 14.1030 MHz. The addition circuit 18 outputs the modulated wave frequency information to the signal generator 12.

The signal generator 12 generates a modulated wave signal based on the modulated wave frequency information. The signal generator 12 outputs the generated modulated wave signal as an FSK signal.

Figure 14:
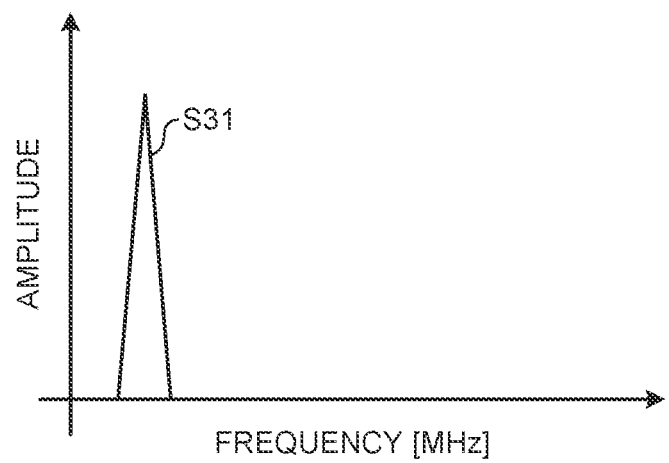
FIG. 14 is a diagram for explaining the FSK signal according to the third embodiment.

FIG. 14 is a diagram for explaining the FSK signal according to the third embodiment. In FIG. 14, a horizontal axis indicates a frequency (MHz). A vertical axis indicates a magnitude of an amplitude. As illustrated in FIG. 14, in the FSK signal according to the third embodiment, only a carrier wave S31 corresponding to the fundamental wave of the AFSK signal input to the transmission device 10B is indicated. That is, the FSK signal according to the third embodiment does not include spurious caused by harmonics of the AFSK signal.

As described above, the third embodiment uses the addition circuit 18 to generate the FSK signal containing only the carrier wave of the desired frequency. Thus, the third embodiment can remove the spurious contained in the FSK signal.

Fourth Embodiment

Figure 15:
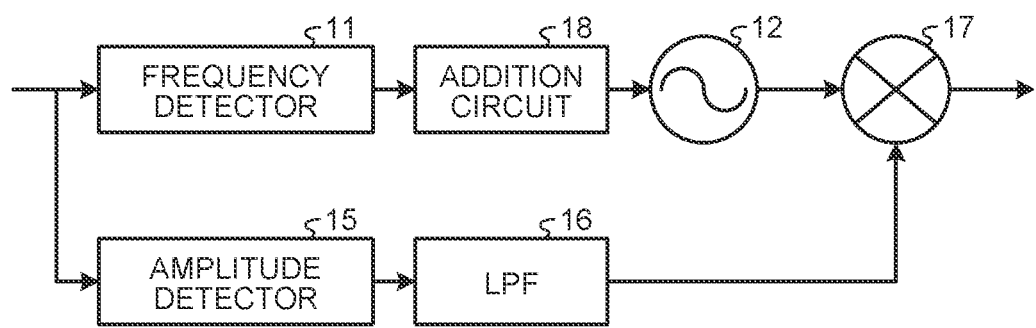
FIG. 15 is a diagram illustrating a configuration example of a transmission device according to a fourth embodiment.

A configuration of the transmission device according to a fourth embodiment will be described with reference to FIG. 15. FIG. 15 is a diagram illustrating a configuration example of the transmission device according to the fourth embodiment.

As illustrated in FIG. 15, a transmission device 10C includes the frequency detector 11, the signal generator 12, the amplitude detector 15, the LPF 16, the multiplication circuit 17, and the addition circuit 18. The transmission device 10C is different from the transmission device 10A illustrated in FIG. 11 in that the transmission device 10C includes the addition circuit 18 and does not include the SSB modulator 13 or the local oscillator circuit 14.

The transmission device 10C is a transmission device capable of outputting, by the addition circuit 18, an FSK signal with amplitude information similar to the amplitude information input as a modulation wave signal like a normal SSB transmission device. In the fourth embodiment, the AFSK signal input to the transmission device 10C is input to the frequency detector 11 and the amplitude detector 15.

The frequency detector 11 detects the frequency of the AFSK signal input to the transmission device 10C to output frequency information regarding the detected frequency to the addition circuit 18. The addition circuit 18 updates the frequency information based on the frequency information input from the frequency detector 11 and the information regarding the desired frequency of the FSK signal, and outputs the modulated wave frequency information to the signal generator 12. The signal generator 12 generates the modulated wave signal based on the modulated wave frequency information and outputs the generated modulated wave signal to the multiplication circuit 17.

The amplitude detector 15 detects the amplitude of the AFSK signal input to the transmission device 10A and outputs the amplitude information regarding the detected amplitude to the multiplication circuit 17. The LPF 16 shapes the AFSK signal to generate the waveform shape signal and outputs the generated waveform shape signal to the multiplication circuit 17.

The multiplication circuit 17 has one input terminal to which the modulated wave signal generated based on the modulated wave frequency information by the addition circuit 18 is input from the signal generator 12. The multiplication circuit 17 has the other input terminal to which the waveform shape signal is input from the LPF 16. The multiplication circuit 17 multiplies the modulated wave signal by the waveform shape signal to generate a modulated wave signal corresponding to the amplitude of the AFSK signal input to the transmission device 10C. That is, the multiplication circuit 17 controls the amplitude of the modulated wave signal. The multiplication circuit 17 outputs the modulated wave signal whose amplitude is controlled as the FSK signal.

Figure 16:
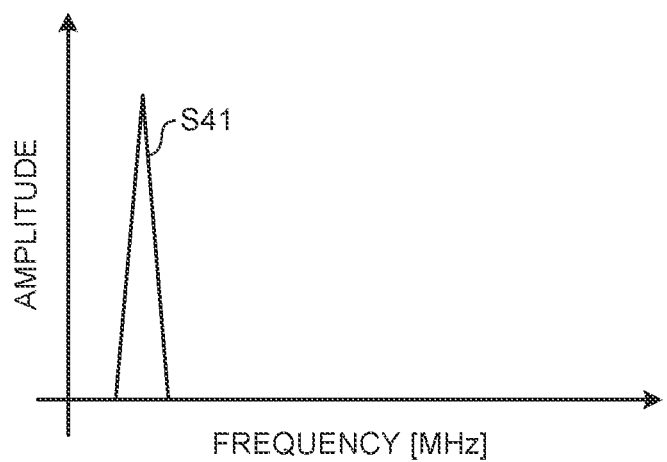
FIG. 16 is a diagram for explaining the FSK signal according to the fourth embodiment.

FIG. 16 is a diagram for explaining the FSK signal according to the fourth embodiment. In FIG. 16, a horizontal axis indicates a frequency (MHz). A vertical axis indicates a magnitude of an amplitude. As illustrated in FIG. 16, in the FSK signal according to the fourth embodiment, only a carrier wave S41 corresponding to the fundamental wave of the AFSK signal input to the transmission device 10B is indicated. That is, the FSK signal according to the third embodiment does not include spurious caused by harmonics of the AFSK signal.

As described above, the fourth embodiment uses the addition circuit 18 to generate the FSK signal of the desired frequency. Thus, the fourth embodiment can remove the spurious contained in the FSK signal.

Further, the fourth embodiment is configured to use the addition circuit 18 to output the FSK signal corresponding to the amplitude of the AFSK signal input to the transmission device 10C. Thus, in the fourth embodiment, the user of the transmission device 10C can control the amplitude of the FSK signal to be output by arbitrarily controlling the amplitude of the AFSK signal input to the transmission device 10C.

According to the present application, the distortion can be reduced.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A transmission device comprising:
   a frequency detector configured to detect a frequency of at least a fundamental wave included in an input signal to output frequency information including a frequency value of the detected frequency;
   a signal generator configured to generate a modulation wave signal of a frequency value which is equivalent to the frequency value of the fundamental wave included in the input signal based on the frequency information; and
   a single side band modulator configured to modulate a carrier wave by the modulation wave signal.

2. A transmission device comprising:
   a frequency detector configured to detect a frequency of an input signal to generate frequency information;
   a signal generator configured to generate a modulation wave signal of a frequency equivalent to the frequency of the input signal based on the frequency information;
   an amplitude detector configured to detect an amplitude of the input signal to generate amplitude information;
   an amplitude control circuit configured to control an amplitude of the modulation wave signal based on the amplitude information; and
   a single side band modulator configured to modulate a carrier wave by the modulation wave signal the amplitude of which is controlled by the amplitude control circuit.

3. A transmission device comprising:
   a frequency detector configured to detect a frequency of at least a fundamental wave included in an input signal to output frequency information including a frequency value of the detected frequency;
   an addition circuit configured to output modulated wave frequency information including a frequency value obtained by adding a frequency value included in frequency information of a carrier wave to the frequency value of the detected frequency included in the frequency information; and
   a signal generator configured to generate a modulated wave signal of a frequency value which is equivalent to the frequency value included in the modulated wave frequency information.

4. The transmission device according to claim 3, further comprising:
   an amplitude detector configured to detect an amplitude of the input signal to generate amplitude information; and
   an amplitude control circuit configured to control an amplitude of the modulated wave signal based on the amplitude information.

* * * * *